(12) United States Patent
Giovannucci et al.

(10) Patent No.: US 7,946,016 B2
(45) Date of Patent: May 24, 2011

(54) METHOD AND MACHINE FOR REMOVING A TYRE FITTED WITH A RIGID INNER RUN-FLAT RING

(75) Inventors: Fabrizio Giovannucci, Rome (IT); Vittorio Collepardi, Aprilia (IT)

(73) Assignee: Bridgestone Corporation, Tokyo (JP)

( * ) Notice: Subject to any disclaimer, the term of this patent is extended or adjusted under 35 U.S.C. 154(b) by 977 days.

(21) Appl. No.: 11/785,001

(22) Filed: Apr. 13, 2007

(65) Prior Publication Data

US 2008/0010804 A1   Jan. 17, 2008

(30) Foreign Application Priority Data

Apr. 14, 2006 (IT) ............................... TO2006A0284

(51) Int. Cl.
*B23P 19/00* (2006.01)
(52) U.S. Cl. .................................................. 29/426.5
(58) Field of Classification Search ............... 29/426.5, 29/426.6, 426.1, 894.31, 894.3; 157/14, 157/1.22, 1.24, 1.26
See application file for complete search history.

(56) References Cited

U.S. PATENT DOCUMENTS

| 2,746,528 | A | * | 5/1956 | Damman | ...................... 157/1.26 |
| 2,850,061 | A |   | 9/1958 | Twiford |
| 2,940,514 | A |   | 6/1960 | Henderson |
| 3,847,198 | A |   | 11/1974 | Brosene, Jr. |
| 4,586,551 | A |   | 5/1986 | Collins |

FOREIGN PATENT DOCUMENTS

EP   1 236 589 A2   9/2002

\* cited by examiner

*Primary Examiner* — John C Hong
(74) *Attorney, Agent, or Firm* — Oliff & Berridge, PLC

(57) ABSTRACT

A method and machine for removing a tire, fitted with a rigid inner run-flat ring, from a relative rim, whereby, once the rim and the tire are fixed onto a turntable having a central hub and rotating about a first axis coaxial with the hub and the tire, a bead of the rigid inner ring is engaged and moved axially outwards of a relative flange of the rim by a hook carried by a lever hinged to the hub and oscillated, with respect to the hub and in a radial plane of the turntable, about a second axis perpendicular to the first axis and rotating about the first axis.

14 Claims, 6 Drawing Sheets

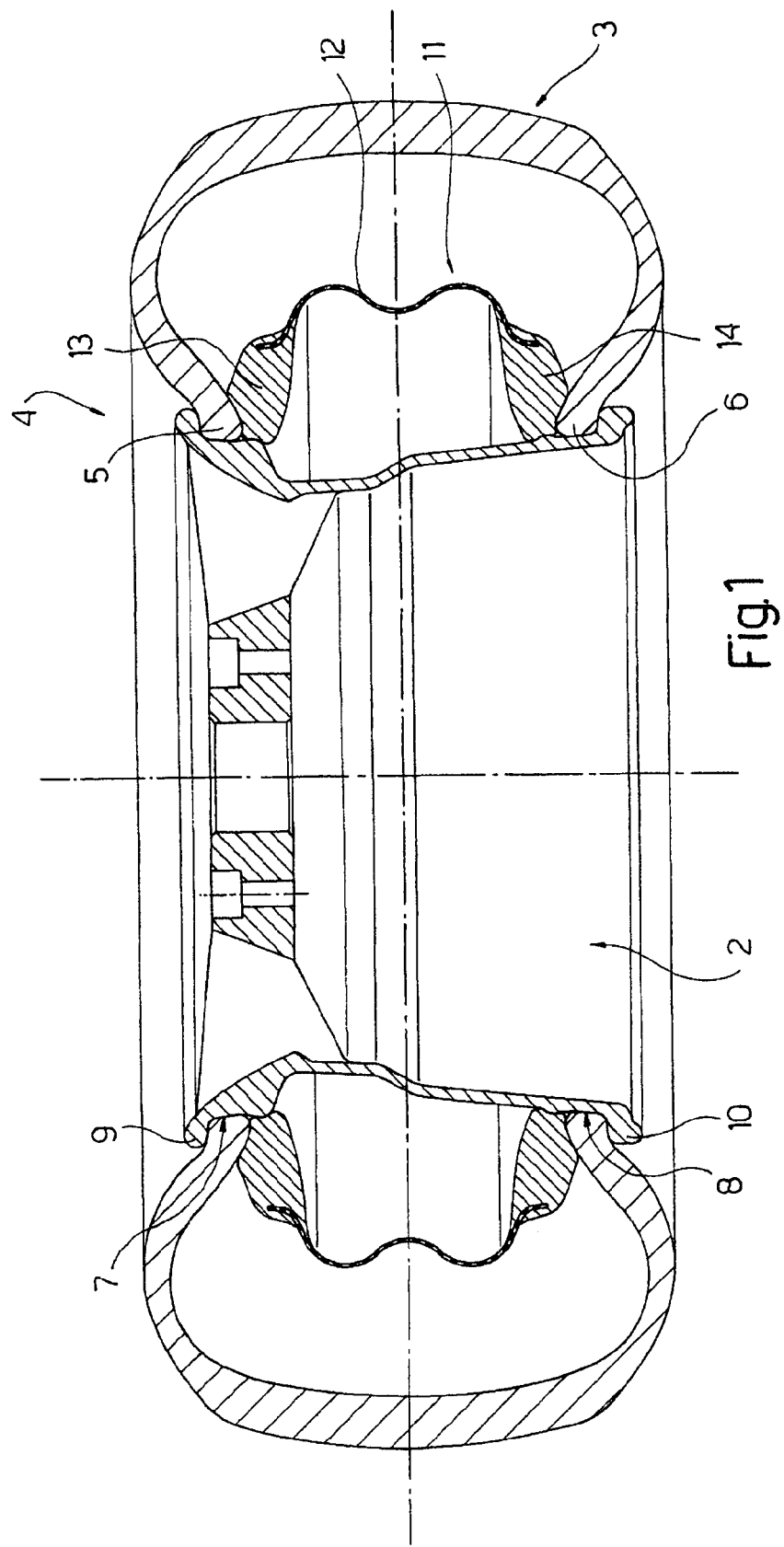

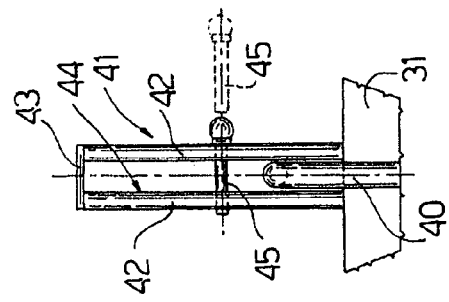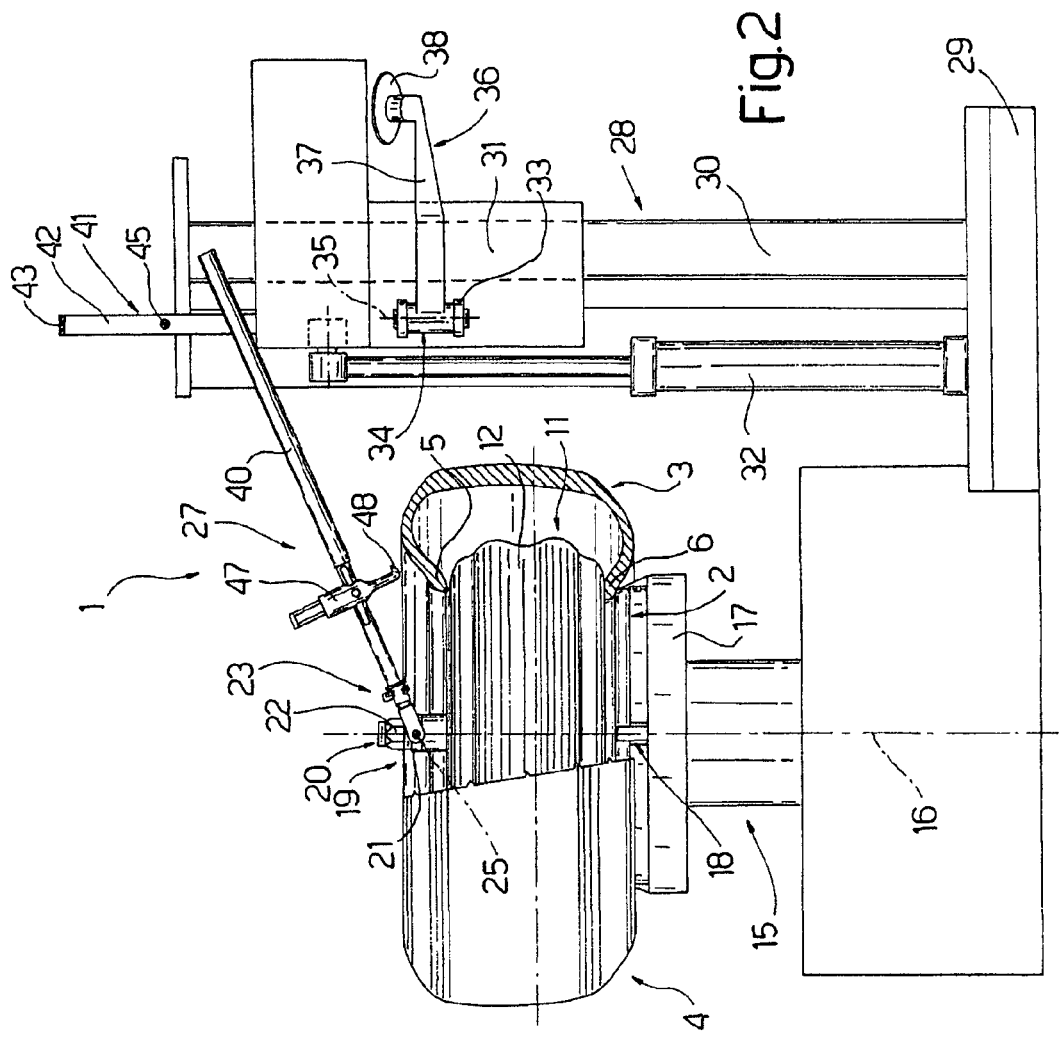

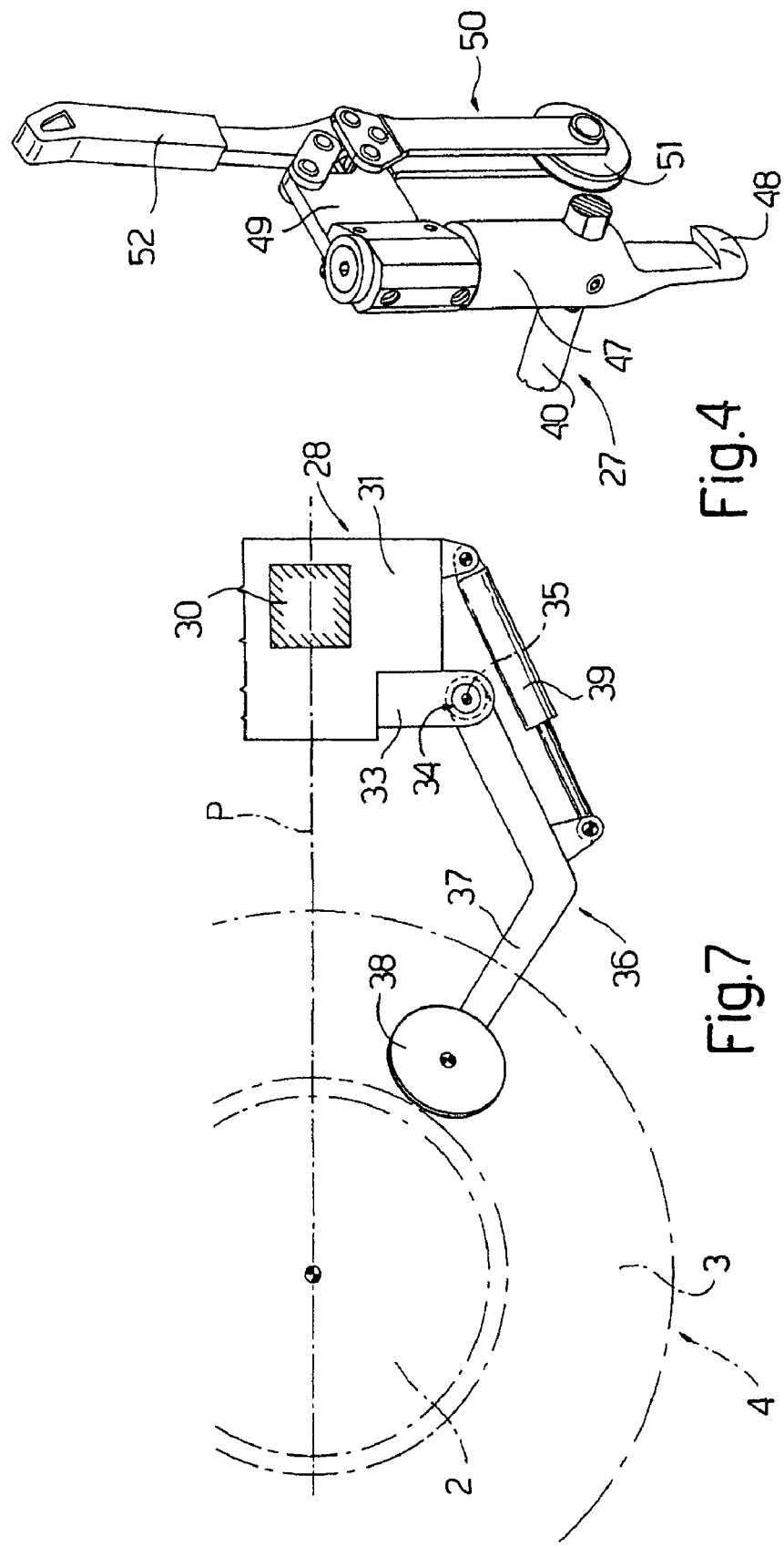

METHOD AND MACHINE FOR REMOVING A TYRE FITTED WITH A RIGID INNER RUN-FLAT RING

The present invention relates to a method and machine for removing a tyre, fitted with a rigid inner run-flat ring, from a relative rim.

BACKGROUND OF THE INVENTION

In the tyre business, tyre removing machines are known designed to remove a tyre, fitted with a rigid inner run-flat ring, from the relative rim.

Known tyre removing machines of this sort normally comprise a turntable rotating about an axis; a self-centring clamping device for clamping the rim and relative tyre on, and coaxially with, the turntable; and a hub coaxial and integral with the turntable. Known tyre removing machines of this sort normally also comprise a tool column located alongside the turntable, parallel to the turntable axis, and having a number of hydraulic jacks for operating respective tools, which project towards the turntable from the tool column, and are designed to act on the tyre to detach the tyre beads and rigid inner ring beads from the relative flanges on the rim, and to insert, between the rim, on one side, and a tyre bead and corresponding rigid inner ring bead, on the other, one or more levers by which to move said two beads axially outwards of the relative rim flange.

Known tyre removing machines of the type described have various drawbacks, on account of the tools projecting from the tool column and so transmitting turning moments to the column which tend to bend the tool column outwards. In the case of a tyre fitted with a rigid inner ring, the forces applied, having to act simultaneously on two side by side beads (the tyre bead and the rigid inner ring bead), are much greater than those applied to a tyre with no rigid inner ring, and tend to produce uncontrolled outward movement of the tools, thus resulting in incorrect use of the tools and, most likely, damage to the tyre and/or rigid inner ring.

SUMMARY OF THE INVENTION

It is an object of the present invention to provide a method and machine for removing a tyre, fitted with a rigid inner run-flat ring, from the relative rim, and which are designed to eliminate the aforementioned drawbacks and, in particular, are cheap and easy to implement.

According to the present invention, there are provided a method and machine for removing a tyre, fitted with a rigid inner run-flat ring, from a relative rim, as claimed in the attached Claims.

BRIEF DESCRIPTION OF THE DRAWINGS

A non-limiting embodiment of the present invention will be described by way of example with reference to the accompanying drawings, in which:

FIG. 1 shows an axial section of a tyre featuring a rigid inner run-flat ring and fitted to a relative rim;

FIG. 2 shows a schematic side view of a preferred embodiment of the tyre removing machine according to the present invention;

FIGS. 4 and 5 show a larger-scale view in perspective and side view, respectively, of a second detail of FIG. 2;

FIG. 6 shows a larger-scale side view of a third detail of FIG. 2;

FIG. 7 shows a larger-scale plan view of a fourth detail of FIG. 2 in a different operating position;

DETAILED DESCRIPTION OF THE INVENTION

Figure 3:
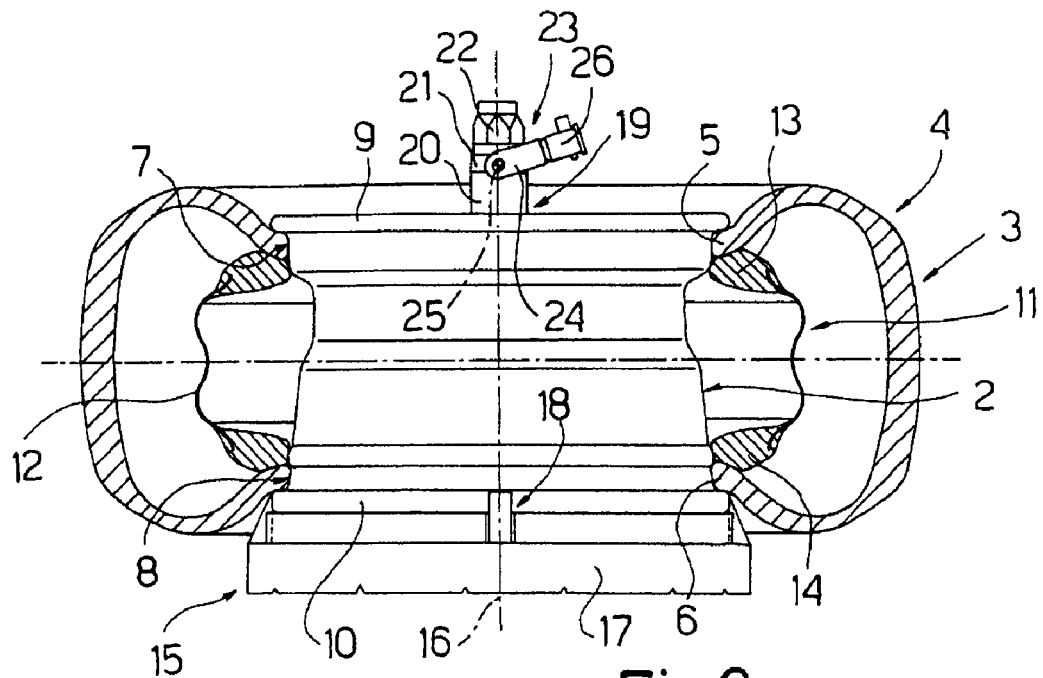
FIG. 3 shows a larger-scale axial section of a first detail of FIG. 2.

Number 1 in FIG. 2 indicates as a whole a tyre removing machine for removing a tyre 3 of a vehicle wheel 4 from a relative rim 2.

As shown in more detail in FIG. 1, tyre 3 is a conventional type, and comprises two beads 5 and 6 fitted to respective cylindrical portions 7 and 8 of rim 2 immediately inwards of respective flanges 9 and 10, of which flange 9 is an outer flange. Tyre 3 has a known rigid inner run-flat ring 11 comprising a toroidal undulated metal central portion 12; and two beads 13 and 14 made of elastomeric material, fitted to respective axial ends of central portion 12, and fitted to rim 2, adjacent to and inwards of respective beads 5 and 6.

As shown in FIG. 2, tyre removing machine 1 comprises a powered turntable 15 having a vertical axis 16 and, on top, a height-adjustable plate 17, which rotates about axis 16, supports wheel 4, and is fitted with a known locating device 18 for engaging flange 10 to lock wheel 4 radially in position, coaxial with axis 16, when rim 2 is placed on plate 17 with flange 10 facing downwards. Turntable 15 also has a central hub 19 coaxial with axis 16 and comprising a removable end portion 20 which, in use, projects above flange 9 and provides for locking wheel 4 axially to plate 17. End portion 20 comprises a rotary ring 21 coaxial with axis 16, locked axially to hub 19 by a nut 22, and defining an end portion of a connecting device 23, which comprises a fork 24 connected to ring 21 to rotate, with respect to ring 21, about an axis 25 perpendicular to axis 16, and fitted with a front coupling 26 for a tool 27 connectable to hub 19 by connecting device 23 and described in detail below.

Tyre removing machine 1 also comprises a tool column 28 located alongside turntable 15 and in turn comprising a base 29, from which extends upwards a vertical prismatic guide 30 for a slide 31, which is moved along prismatic guide 30 by a single hydraulic or pneumatic jack 32 interposed between slide 31 and base 29.

Figure 8:
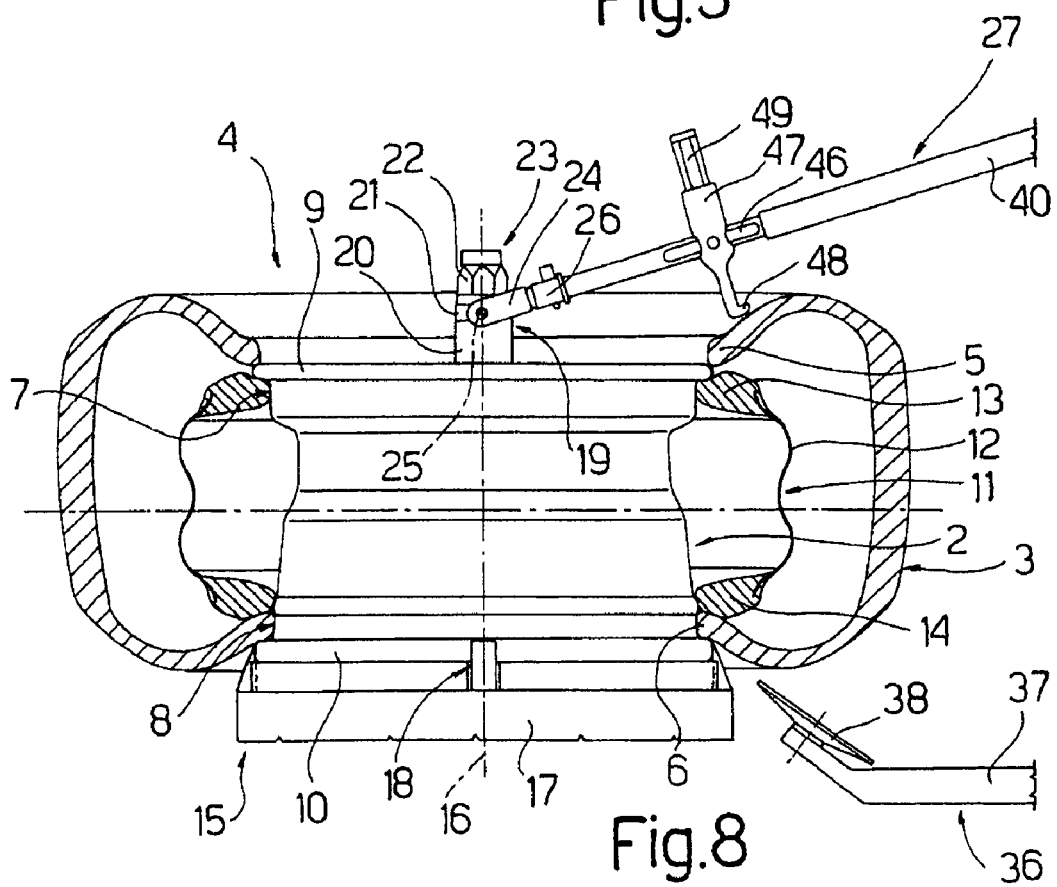
FIGS. 8 to 11 show partial larger-scale views of the FIG. 2 machine in respective successive operating positions.
Figure 11:
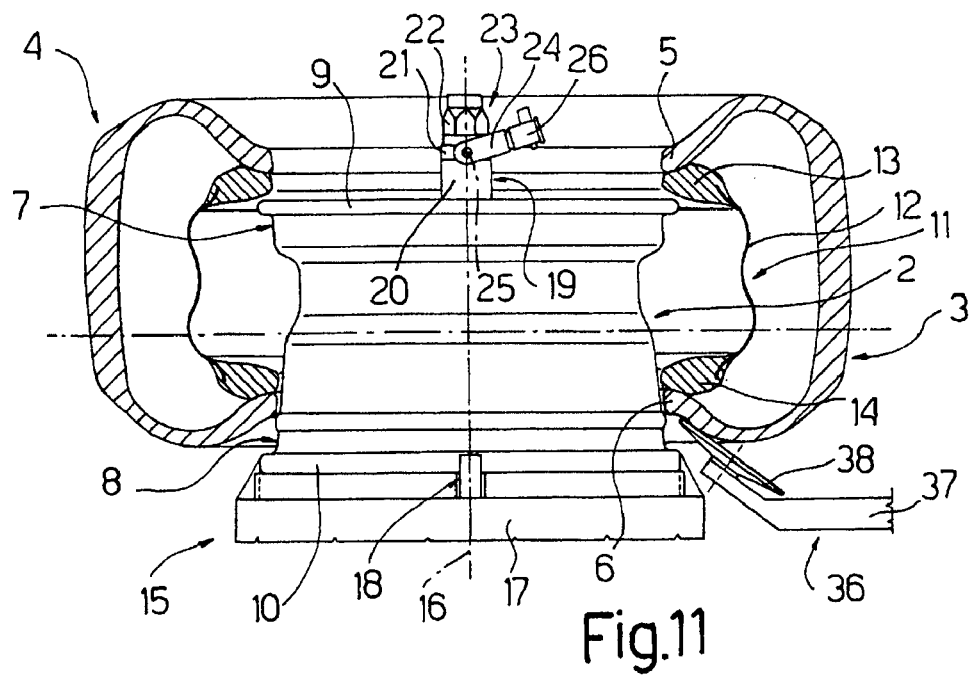

Slide 31 is fitted with a number of known tools—not shown for the sake of simplicity, and hereinafter referred to as "disriding tools"—which act on tyre 3 to detach bead 5 from flange 9 and extract bead 5 from rim 2. As shown in FIG. 2, and particularly in FIG. 8, a bracket 33 projects laterally outwards from a bottom portion of slide 31, and is fitted on its free end, by means of a hinge 34 with an axis 35 parallel to axis 16, with a pressure tool 36 comprising an elbow lever 37, one end of which is connected to bracket 33, and the other end of which is fitted with an upward-sloping pin fitted in rotary manner with a plate 38, the periphery of which lies in a plane sloping slightly upwards towards axis 16. The angular position of pressure tool 36 about axis 35 and, therefore, the distance between plate 38 and axis 16 are controllable by a brace 39 (FIG. 7) adjustable in length and interposed between slide 31 and an intermediate portion of lever 37.

As shown in FIG. 2, tool 27 comprises a lever 40, a first end of which is connected removably to fork 24 by front coupling 26, and a second end of which extends over slide 31 and through a portal 41 integral with slide 31 and extending upwards from the top end of slide 31. As shown in FIG. 6, portal 41 comprises two substantially vertical posts 42 joined by a top cross member 43 and defining between them a gap 44, which lies in a radial plane P (FIG. 7) with respect to axis 15, is engaged, in use, by lever 37, and is divided into two parts by a pin 45 parallel to cross member 43 and fitted removably through intermediate portions of posts 42.

In actual use, lever 40 comprises a first end fitted removably to front coupling 26 of connecting device 23; a second end extending through gap 44; and an intermediate portion defined by a prismatic guide 46 for fitting, in an adjustable position along lever 40, an intermediate portion of a rod 47 positioned crosswise to lever 40 and extending in radial plane P.

Figure 5:
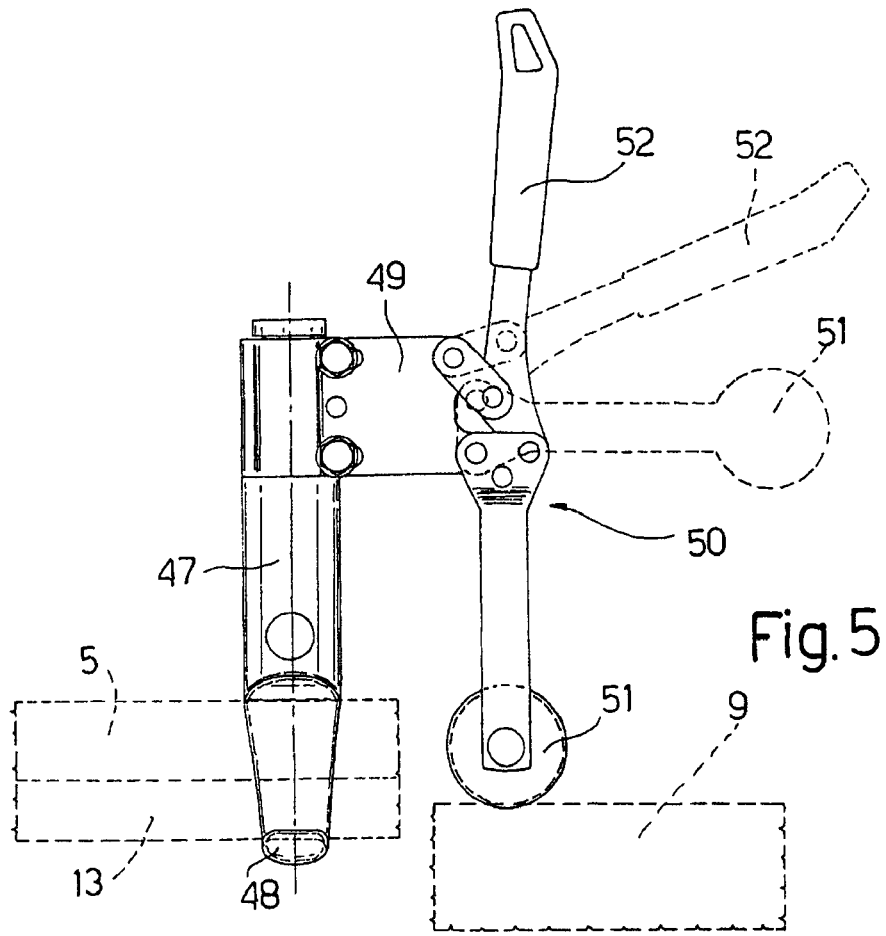

As shown more clearly in FIGS. 4 and 5, rod 47 comprises a first end defined by a hook 48, which faces radially outwards with respect to axis 16 when lever 40 is attached to connecting device 23; and a second end above the first end, in use, and fitted with a bracket 49 perpendicular to lever 40 and fitted on its free end with a known toggle tappet 50 comprising a tappet roller 51, which is movable, by a hand lever 52, from a raised rest position (shown by the dash line in FIG. 5) to a lowered work position (shown by the continuous line in FIG. 5), in which tappet roller 51 rests, in use, on flange 9 to keep hook 48 in such an axial position, with respect to rim 2, that a portion of bead 13, when engaged by hook 48, is positioned and maintained axially outwards of flange 9.

Operation of tyre removing machine 1 will now be described with reference to a wheel 4, which has been mounted on turntable 15, with flange 10 of relative rim 2 facing downwards and contacting turntable 15, has been positioned coaxially with axis 16 by locating device 18, and has been locked axially by hub 19; and as of the instant (FIG. 8) in which bead 5 of tyre 3, previously engaged by said "disriding tools" (not shown), has been extracted from relative flange 9.

At this point, one end of lever 40 is fitted to front coupling 26, and rod 47 is locked in position on lever 40 so that the distance between hook 48 and axis 25 is approximately equal to but no less than the radius of flange 9. The other end of lever 40 is inserted through gap 44 of portal 41, which is fitted with pin 45 and maintained by slide 31 in a raised position (FIG. 2), in which lever 40 rests on a front edge of slide 31 at the base of portal 41.

Figure 9:
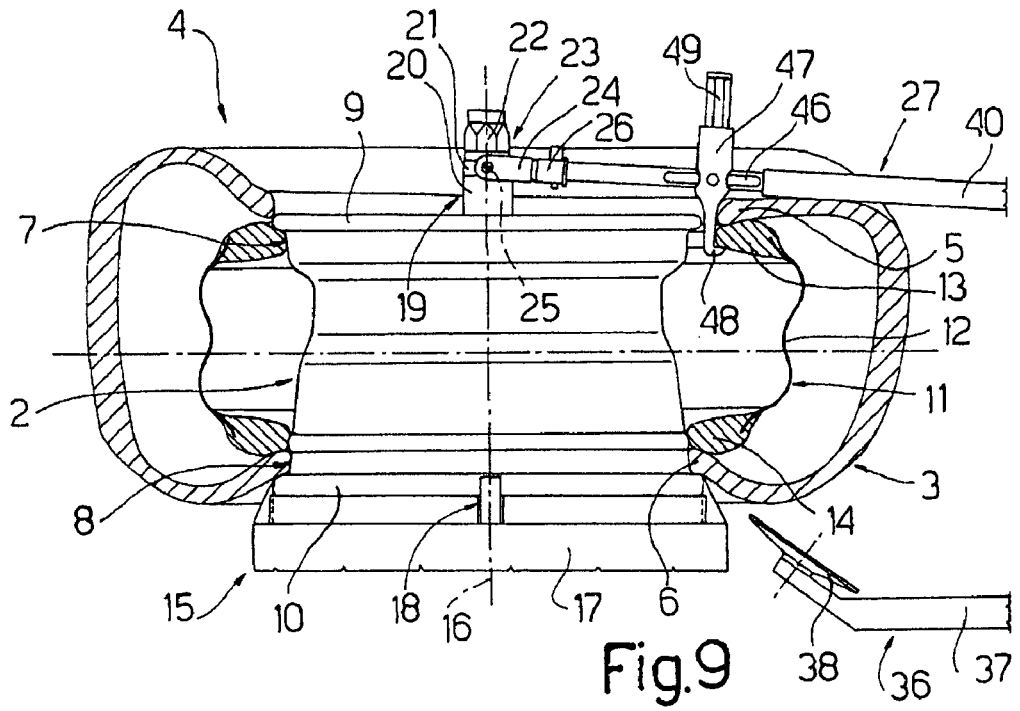

Next (FIG. 9), jack 32 is operated to lower slide 31, which takes lever 40 with it, by force of gravity, until hook 48 contacts tyre 3 just outside flange 9. Upon hook 48 contacting tyre 3, downward rotation of lever 40 in radial plane P is arrested until, as slide 31 continues moving down into a lowered position not shown, pin 45 comes into contact with lever 40 and draws it down further to insert hook 48 inwards of both bead 5 of tyre 3 and bead 13 of rigid ring 11.

When slide 31 reaches said lowered position not shown, pressure tool 36 is positioned just below tyre 3, and can be fixed, by adjusting the length of brace 39, so that the periphery of plate 38 is positioned tangent to bead 6, just outwards of flange 10, and substantially in radial plane P.

Figure 10:
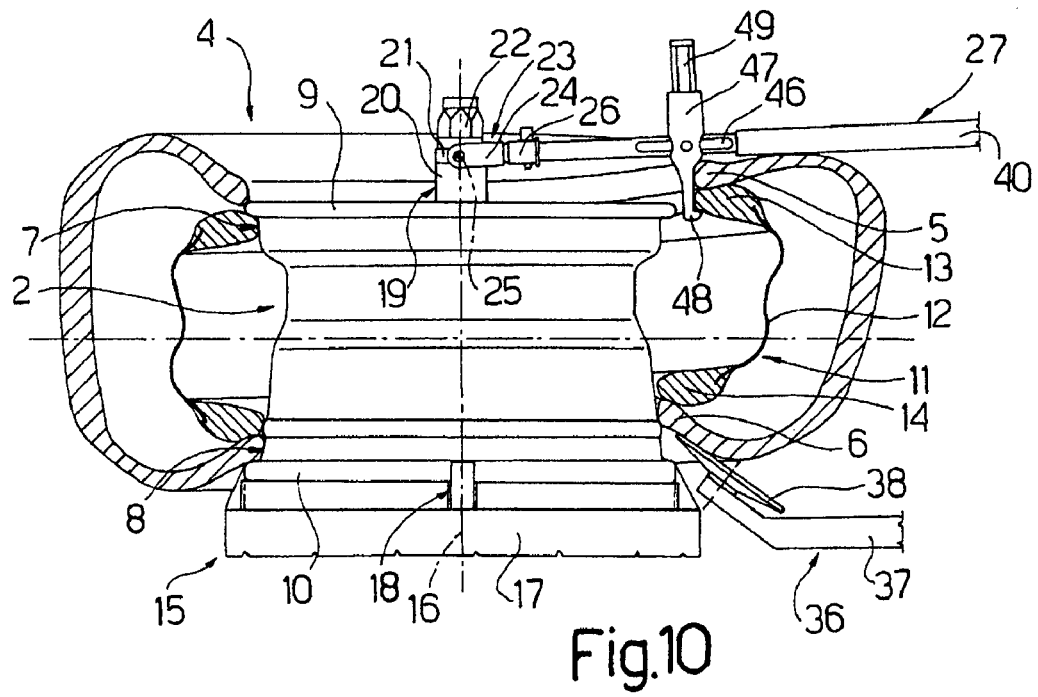

Jack 32 is then operated again to move slide 31 back into the raised position in FIG. 2. Over a first part of this movement, lever 40 remains in the FIG. 9 engaged position, and is simply released by pin 45, whereas pressure tool 36 acts on the tyre to unseat beads 6 and 14 upwards (FIG. 10). On eventually contacting the front edge of slide 31, lever 40 is also raised, by rotating about axis 25 in radial plane P, and, in so doing, draws a portion of bead 13 outwards of and over flange 9 (FIG. 10). This latter movement is assisted by pressure tool 36, which, as it continues moving upwards, pushes the whole of tyre 3, and particularly the part of tyre 3 astride radial plane P, upwards to assist extraction, over flange 9, of the portion of bead 13 engaged by hook 48.

At this point, toggle tappet 50, until now in the rest position shown by the dash line in FIG. 5, is moved, using hand lever 52, into the work position shown by the continuous line in FIG. 5, and in which tappet roller 51 faces flange 9. A slight downward movement of slide 31 at this point brings tappet roller 51 to rest firmly on flange 9, and detaches lever 40 from the front edge of slide 31.

When turntable 15, at this point, is operated, and lever 40 simultaneously locked angularly in radial plane P by portal 41, tappet roller 51 rolls along the whole of flange 9 to extract the whole of bead 13 from flange 9. At this point, lever 40 can be removed, and slide 31 moved into the fully-raised position, to allow pressure tool 36 to remove the whole of tyre 3 and rigid ring 11 off rim 2.

The advantages of tyre removing machine 1, as compared with known machines, are obvious, considering that, on tyre removing machine 1, the tool for removing rigid ring 11 off rim 2, i.e. tool 27, is hinged to hub 19, as opposed to being connected to tool column 28. As a result, despite the force (practically a ton) exerted on tool 27 by jack 32, the distance between hook 48 and axis 16 remains substantially unchanged when removing rigid ring 11, thus practically eliminating any risk of damaging tyre 3 when inserting hook 48 between bead 13 and rim 2.

Moreover, using tool 27, one jack 32 can be used for all the operations involved in removing tyre 3 and rigid ring 11 off rim 2.

The invention claimed is:

1. A method of removing, from a relative rim, a tire fitted with a rigid inner run-flat ring having first beads, each fitted to the rim inwards of a respective second bead of the tire, the method comprising:
    fixing the rim and the tire onto a turntable having a central hub and rotating about a first axis coaxial with the hub;
    inserting, between the rim and one of the first beads of the rigid inner run-flat ring, a hook carried by a lever hinged to the hub;
    oscillating the lever, with respect to the hub, in a radial plane of the turntable and about a second axis perpendicular to the first axis;
    rotating the lever with respect to the first axis, so as to exert an axial pull on the one of the first beads of the rigid inner run-flat ring by means of the hook,
        wherein the rotating of the lever moves a portion of the one of the first beads of the rigid inner run-flat ring axially outwards of a relative flange of the rim in one step with a portion of one of the second beads of the tire which is arranged outwards of the portion of the one of the first beads of the rigid inner run-flat ring and is pushed axially outwards of the relative flange of the rim by the portion of the one of the first beads of the rigid inner run-flat ring; and
    rotating the turntable about the first axis, with the hook still engaging the one of the first beads of the rigid inner run-flat ring, and with the lever locked angularly about the first axis.

2. The method as claimed in claim 1, wherein, when moving the portion of the one of the first beads axially outwards of the relative flange, axial thrust is exerted on the tire in a same direction as the axial pull exerted by the hook on the one of the first beads.

3. The method as claimed in claim 2, wherein the axial thrust is exerted on the tire at a position close to another one of the first beads.

4. The method as claimed in claim 2, wherein the axial thrust acts substantially in the radial plane.

5. The method as claimed in claim 2, wherein the axial pull and axial thrust are applied by one powered actuating member movable parallel to the first axis.

6. The method as claimed in claim 5, wherein the hook is inserted between the rim and the one of the first beads by the actuating member oscillating the lever about the second axis and towards the tire.

7. The method as claimed in claim 5, wherein the lever is locked angularly about the first axis by connecting the lever transversely to the actuating member.

8. The method as claimed in claim 1, further comprising:
  locating a tool column alongside the turntable and parallel to the first axis;
  moving a powered slide along the tool column, the powered slide supporting pressure means being movable in a same direction as the hook; and
  connecting the powered slide, in use, to the lever to oscillate the lever in the radial plane.

9. The method as claimed in claim 8, further comprising connecting the powered slide, in use, to the lever to lock the lever angularly about the first axis.

10. The method as claimed in claim 8, wherein the powered slide has an axial gap having two ends and engaged in a sliding manner by a free end of the lever, and the lever is positioned, in use, to contact one or the other of the two ends as the lever oscillates about the second axis.

11. The method as claimed in claim 1, further comprising fitting the hook to the lever in an adjustable position along the lever.

12. The method as claimed in claim 1, further comprising fitting the lever removably to the hub.

13. The method as claimed in claim 12, further comprising fitting the lever removably to the hub with an interposition of a connecting device fitted in a rotary manner to the hub.

14. The method as claimed in claim 13, wherein the connecting device comprises:
  a ring coaxial with the first axis and fitted in a rotary and axially-fixed manner to the hub;
  a fork fitted to the ring to oscillate, with respect to the ring, about the second axis; and
  a front coupling integral with the fork and for receiving one end of the lever in an extractable manner.

\* \* \* \* \*